United States Patent Office 2,862,912
Patented Dec. 2, 1958

2,862,912

VINYL HALIDE POLYMERIZATION PROCESS

John B. Ott, Northampton, Mass., assignor to Monsanto Chemical Company, St. Louis, Mo., a corporation of Delaware No Drawing. Application March 22, 1956
Serial No. 573,068

13 Claims. (Cl. 260—78.5)

This invention relates to the polymerization of vinyl halide-containing materials. More particularly, this invention relates to the preparation of homopolymers and interpolymers of vinyl halides in granular form.

In one of the customary preparations of vinyl halide-containing polymers, the monomers are polymerized in an aqueous medium containing a dispersing agent to obtain the polymer in the form of small granules which are easily separated from the polymerization medium by filtration. Ideally, the granular polymers so obtained should be of a uniform small size and highly porous in nature so as to readily absorb plasticizers. The presence of large, non-porous, glassy granules is undesirable, since such granules do not readily absorb plasticizer and this frequently leads to heterogeneity in the final product. Such heterogeneity is particularly noticeable when the vinyl halide-containing polymer is calendered into thin films.

Many of the dispersing agents that have been suggested have been subject to certain difficulties. For example, many of the dispersing agents do not give porous granules of the desired small size. With ionic dispersing agents, a serious problem arises in the removal of the dispersing agent from the polymeric material. Certain dispersing agents are undesirable in that they detract from the stability of the polymeric product.

It is an object of this invention to provide an improved process for the preparation of vinyl halide-containing polymers.

Another object of this invention is to provide an improved process for the preparation of vinyl halide-containing polymers in granular form.

Other objects and advantages of this invention will become apparent from the following detailed description thereof.

It has been discovered that granular vinyl halide-containing polymers of consistently excellent quality can be prepared by dispersing and polymerizing the vinyl halide monomer in a dilute aqueous solution of a water-soluble interpolymer of an acidic monomer of the group consisting of acrylic acid, methacrylic acid and mixtures thereof and a monomer of the group consisting of 2-ethylhexyl acrylate, 2-ethylhexyl methacrylate and mixtures thereof. The water-soluble interpolymers employed contain 94.5–98.5 mol percent of the acidic monomer and, correspondingly, 5.5–1.5 mol percent of the 2-ethylhexyl ester monomer.

The following examples are set forth to illustrate more clearly the principle and practice of this invention to those skilled in the art. All parts are by weight.

EXAMPLE I

Into a glass reaction vessel are charged 125 parts of water, 0.25 part of lauroyl peroxide and 30 parts of a 1% aqueous solution of an interpolymer consisting of 95.5 mol percent of acrylic acid and 4.5 mol percent of 2-ethylhexyl acrylate. The atmosphere in the reaction vessel is swept free of oxygen with gaseous vinyl chloride monomer and 100 parts of vinyl chloride are charged to the reaction vessel which is then sealed. The sealed glass reaction vessel is rotated end over end at 50° C. for 20 hours at the end of which time the polymerization is complete.

The product has a desirable small particle size with approximately 50% of the particles passing through a 100 mesh screen and only about 2% of the polymer particles being retained on a 40 mesh screen. The polymer product readily absorbs plasticizer, has excellent heat and light stability and has good electrical insulating properties.

The acrylic acid-2-ethylhexyl acrylate interpolymer employed as the suspending agent in this example has a specific viscosity of 2.8 as determined in a 1% solution in water at 25° C. Henceforth, wherever specific viscosities of such interpolymers are reported, it will be understood that they are determined on this same basis.

EXAMPLE II

Example I is repeated except that an interpolymer consisting of 95.5 mol percent of acrylic acid and 4.5 mol percent of 2-ethylhexyl methacrylate and having a specific viscosity of 2.0 is employed as the dispersing agent. Essentially comparable results are obtained.

EXAMPLE III

Several polymerizations are carried out following the procedure outlined in Example I. The acrylic acid-2-ethylhexyl acrylate interpolymers employer as dispersing agents contain 4.5 mol percent of 2-ethylhexyl acrylate and are of varying molecular weight (indicated by specific viscosity) to indicate the effect of this variable on efficiency as a dispersing agent. The results are set forth in Table I.

Table I

| Run No. | Specific viscosity of suspending agent, 1% in H₂O at 25° C. | Concentration suspending agent, weight percent on monomer | Nature of polymer |
|---|---|---|---|
| 1 | 1.3 | 0.2 | Fine homogenous powder. |
| 2 | 1.3 | 0.3 | Do. |
| 3 | 2.8 | 0.2 | Do. |
| 4 | 2.8 | 0.3 | Do. |
| 5 | 2.9 | 0.3 | Do. |
| 6 | 5.7 | 0.3 | Do. |
| 7 | 7.6 | 0.3 | Do. |

It is seen from the above table that, within the range studied, the results obtained are independent of the molecular weight of the dispersing agent.

EXAMPLE IV

Several polymerizations are carried out following the procedure outlined in Example I. The mol ratio of acrylic acid to 2-ethylhexyl acrylate in the dispersing agent is varied to illustrate the effect of this variable upon the efficiency of the interpolymer as a dispersing agent. The results are set forth in Table II.

Table II

| Run No. | Mol percent 2-ethylhexyl acrylate in suspending agent | Specific viscosity suspending agent [1] | Nature of polymer |
|---|---|---|---|
| 1 | 1.5 | 4.0 | Fairly fine powder. |
| 2 | 2.0 | 4.3 | Fine homogeneous powder. |
| 3 | 3.5 | 4.0 | Do. |
| 4 | 4.5 | 5.7 | Do. |
| 5 | 5.5 | 4.0 | Fairly fine powder. |

[1] Determined in 1% solution in water at 25° C.

From the above table it is seen that operable results are obtained when the dispersing agent contains from 1.5 to 5.5 mol percent of the 2-ethylhexyl ester. Optimum results are obtained when the dispersing agent contains from about 2.5 mol percent to about 5.0 mol percent of the 2-ethylhexyl ester.

EXAMPLES V–IX

Several additional polymerizations are carried out employing the polymerization systems set forth in Table III. In each case the polymer is obtained in a fine granular form and has good electrical insulating properties.

*Table III*

| Example | V | VI | VII | VIII | IX |
|---|---|---|---|---|---|
| Vinyl chloride | 100 | 90 | 95 | 100 | 90 |
| Vinyl acetate | | 10 | | | |
| Diethyl maleate | | | 5 | | 10 |
| Glyceryl monostearate | 0.1 | | | | 0.1 |
| Dibutyl phthalate | | | | 5 | |
| Water | 150 | 160 | 150 | 150 | 150 |
| Benzoyl peroxide | 0.2 | | | 0.2 | |
| Lauroyl peroxide | | 0.3 | 0.2 | | 0.3 |
| Dispersing agent [1] | 0.1 | 0.2 | 0.2 | 0.2 | 0.1 |
| Temperature, °C | 50 | 50 | 50 | 50 | 50 |
| Duration, hours | 20 | 20 | 20 | 20 | 20 |

[1] Interpolymer 95.5 mol percent of acrylic acid and 4.5 mol percent of 2-ethylhexyl acrylate. Specific viscosity=4.0.

EXAMPLE X

Example I is repeated except that an interpolymer consisting of 95.5 mol percent of methacrylic acid and 4.5 mol percent of 2-ethylhexyl acrylate and having a specific viscosity of 0.2 is employed as the dispersing agent. Essentially comparable results are obtained.

EXAMPLE XI

Example I is repeated except that an interpolymer consisting of 98.5 mol percent of methacrylic acid and 1.5 mol percent of 2-ethylhexyl methacrylate and having a specific viscosity of 0.2 is employed as the dispersing agent. A granular product is obtained.

The dispersing agents employed in the practice of the present invention are water-soluble interpolymers of an acidic monomer of the group consisting of acrylic acid, methacrylic acid and mixtures thereof and a monomer of the group consisting of 2-ethylhexyl acrylate, 2-ethylhexyl methacrylate and mixtures thereof. For purposes of this invention the interpolymers are considered to be water-soluble if 0.5 part of the interpolymer will dissolve in 99.5 parts of water at 25° C. For reasons of both cost and performance, it is preferred to employ interpolymers of acrylic acid and 2-ethylhexyl acrylate.

The water-soluble interpolymers employed as the dispersing agents in this invention should contain from 1.5 to 5.5 mol percent and preferably 2.5 to 5.0 mol percent of the 2-ethylhexyl ester with the balance of the interpolymer being the acidic monomer.

The suitability of the interpolymers as dispersing agents is influenced by the particular acidic monomer included in the interpolymer. In general, interpolymers containing methacrylic acid as the acidic monomer are less hydrophilic than otherwise comparable interpolymers containing acrylic acid as the acidic monomer. In a polymerization system where an interpolymer containing methacrylic acid as the acidic monomer is employed in lieu of an interpolymer containing acrylic acid as the acidic monomer, the molar proportion of the 2-ethylhexyl ester included in the interpolymer should be decreased.

As established in Example III, the dispersing action of the interpolymers is affected but slightly by wide variations in molecular weight. The preferred dispersing agents have specific viscosities of at least about 0.1 when methacrylic acid is the acidic monomer included in the interpolymer and at least about 0.8 when acrylic acid is the acidic monomer included in the interpolymer. Both of the above noted specific viscosity values are determined in 1% solutions in water at 25° C. in accordance with the well known formula:

$$\text{Specific viscosity} = \frac{\text{Solution viscosity} - \text{solvent viscosity}}{\text{Solvent viscosity}}$$

Methods for preparing the dispersing agents employed in the present invention are described in detail in my copending application Serial No. 573,069, filed of even date herewith and that description is incorporated herein by reference. The preferred method for preparing the dispersing agents comprises dissolving an appropriate monomer mixture and a free radical generating polymerization initiator in an organic liquid which is a solvent for a monomer mixture but a non-solvent for the interpolymer prepared therefrom and heating to effect polymerization.

A desirable feature of the present invention is that the dispersing agents employed are stable in aqueous solutions for long periods of time. Thus, in commercial practice, the dispersing agent will be dissolved in water to prepare large volumes of dispersing agent solution which can be stored and used as needed.

Usually only a small concentration of the dispersing agent of this invention is necessary, e. g., 0.005–2.0% and more particularly 0.1–0.5% based on the amount of water used is usually sufficient. The amount of dispersing agent to be used in any particular polymerization system depends upon a number of factors and by controlling the concentration of dispersing agent employed under a given set of polymerization conditions it is possible to obtain the vinyl halide-containing polymer in a controlled, desired particle size. Among the more important parameters which affect the concentration of the dispersing agent to be employed is the water:monomer ratio. Thus, as the water:monomer ratio is increased, the ratio of dispersing agent to water may be decreased if the same average particle size is desired in the polymer. Other factors affecting the amount of the dispersing agent to be employed in the polymerization include the particle size desired in the polymer particles and the speed of agitation. Frequently, there is found to be an optimum amount of dispersing agent to be employed for obtaining a minimum particle size and amounts of dispersing agent above or below this optimum amount produce polymers having a larger particle size. It is usually preferred to employ the smallest amount of dispersing agent that will produce polymers of the desired particle size.

Where it is desired to obtain the granular vinyl halide-containing polymer in an extremely fine particle size, it is sometimes desirable to employ certain particle size reducing agents in conjunction with the interpolymer dispersing agents. Examples of the particle size reducing agent that can be used for this purpose include (1) unsaturated aliphatic carboxylic acids containing from 10 to 20 carbon atoms, (2) hydroxyl group-substituted aliphatic carboxylic acids containing from 10 to 20 carbon atoms, (3) halogen-substituted unsaturated aliphatic carboxylic acids containing from 10 to 20 carbon atoms and (4) partial esters of polyhydric alcohols and aliphatic carboxylic acids, said alcohols containing from 2 to 8 carbon atoms, said acids containing from 10 to 20 carbon atoms. Such particle size reducing agents are employed in the amount of from about 0.01% to about 5.0%, based on the monomeric materials. The best results are usually obtained with glycerol mono-octadecanoate.

It is sometimes observed that a reduction in particle size is obtained by carrying out the polymerization in the presence of 0.5–15% of certain plasticizers such as (1) dialkyl phthalates in which the alkyl groups contain 2 to 10 carbon atoms, (2) glycol esters of fatty acids, said glycols containing not more than ten carbon atoms and said fatty acids containing 2 to 9 carbon atoms and (3) phosphoric acid esters of hydroxybenzenes from the group consisting of phenol, cresols and xylenols. The particle size reduction obtained by polymerizing in the presence of these plasticizers is not necessarily additive to that obtained with the use of the particle size reducing agents discussed in the paragraph immediately above.

Except for the dispersing agent employed, the polymerizations of the present invention are carried out in the conventional manner. The ratio of water to monomers may vary from 1:1 to approximately to 9:1, but is ordinarily set in the range of about 1.5:1. The polymerization initiators employed are normally free-radical generating initiators such as benzoyl peroxide, lauroyl peroxide, ditertiary butyl peroxide, oleyl peroxide, toluyl peroxide and the like.

The process of the present invention is useful in the polymerization of vinyl fluoride, vinyl chloride, vinyl bromide and mixtures thereof and the interpolymerization of such vinyl halides with interpolymerizable essentially water-insoluble unsaturated compounds such as vinyl esters of carboxylic acids, e. g., vinyl acetate, vinyl propionate, vinyl butyrate, vinyl stearate, vinyl benzoate; esters of unsaturated acids, e. g., methyl acrylate, ethyl acrylate, butyl acrylate, allyl acrylate and the corresponding esters of methacrylic acid; amides, such as acrylamide, acrylanalide, methacrylamide, etc.; nitriles, e. g., acrylonitrile, methacrylonitrile; vinylidene chloride; trichloroethylene; esters of alpha,beta-unsaturated polycarboxylic acids, e. g., the methyl, ethyl, propyl, butyl, amyl, hexyl, heptyl, octyl, allyl and methallyl esters of maleic, crotonic, itaconic and fumaric acids and the like. Preferably, in the case of interpolymerization, a predominant proportion, i. e., more than 50% by weight, of the mixture of monomers is a vinyl halide, and especially vinyl chloride.

The above descriptions and particularly the examples are set forth by way of illustration only. It will be obvious to those skilled in the art that many variations and departures therefrom can be made without departing from the spirit and scope of the invention herein described.

What is claimed is:

1. In a process for preparing polymerization products in granular form, the step which comprises polymerizing an aqueous dispersion of a polymerizable material containing a vinyl halide from the group consisting of vinyl fluoride, vinyl chloride, vinyl bromide and mixtures thereof in the presence of, as a dispersing agent, a water-soluble interpolymer consisting of 94.5–98.5 mol percent of an acidic monomer of the group consisting of acrylic acid, methacrylic acid and mixtures thereof and, correspondingly, 5.5–1.5 mol percent of a monomer of the group consisting of 2-ethylhexyl acrylate, 2-ethylhexyl methacrylate and mixtures thereof.

2. A process as defined in claim 1 in which the dispersing agent employed is a water-soluble interpolymer of acrylic acid and 2-ethylhexyl methacrylate.

3. A process as defined in claim 1 in which the dispersing agent employed is a water-soluble interpolymer of methacrylic acid and 2-ethylhexyl acrylate.

4. A process as defined in claim 1 in which the dispersing agent employed is a water-soluble interpolymer of methacrylic acid and 2-ethylhexyl methacrylate.

5. A process as dfined in claim 1 in which the polymerizable material is vinyl chloride.

6. A process as defined in claim 1 in which the dispersing agent is present in the proportion of 0.005 to 2.0% based on the amount of water.

7. A process as defined in claim 1 in which the dispersing agent employed is a water-soluble interpolymer of acrylic acid and 2-ethylhexyl acrylate.

8. A process as defined in claim 7 in which the water-soluble interpolymer contains 95.0–97.5 mol percent of acrylic acid and, correspondingly, 5.0–2.5 mol percent of 2-ethylhexyl acrylate.

9. In a process for preparing vinyl chloride-containing polymerization products in granular form, the step which comprises polymerizing an aqueous dispersion containing vinyl chloride, in the presence of 0.005 to 2.0%, based on the water present, of a water-soluble interpolymer consisting of 95.0–97.5 mol percent of acrylic acid and, correspondingly, 5.0–2.5 mol percent of 2-ethylhexyl acrylate.

10. In the process for preparing polymerization products in granular form, the step which comprises polymerizing in an aqueous dispersion a mixture of vinyl chloride and an alkyl ester of an alpha,beta-unsaturated dicarboxylic acid in the presence of, as a dispersing agent, a water-soluble interpolymer consisting of 95.0–97.5 mol percent of acrylic acid and, correspondingly, 5.0–2.5 mol percent of 2-ethylhexyl acrylate.

11. A process as defined in claim 10 in which the alkyl ester of the alpha,beta-unsaturated dicarboxylic acid employed is diethyl maleate.

12. In a process for preparing polymerization products in granular form, the step which comprises polymerizing in an aqueous dispersion a mixture of vinyl chloride and a vinyl ester of a carboxylic acid in the presence of, as a dispersing agent, a water-soluble interpolymer consisting of 95.0–97.5 mol percent of acrylic acid and, correspondingly, 5.0–2.5 mol percent of 2-ethylhexyl acrylate.

13. A process as defined in claim 12 in which the vinyl ester of a carboxylic acid employed is vinyl acetate.

References Cited in the file of this patent

UNITED STATES PATENTS 2,322,309    Morgan et al. _____ June 22, 1943

FOREIGN PATENTS 826,358    Germany _____ Jan. 3, 1952